United States Patent
Liebermann et al.

(10) Patent No.: US 7,774,194 B2
(45) Date of Patent: Aug. 10, 2010

(54) METHOD AND APPARATUS FOR SEAMLESS TRANSITION OF VOICE AND/OR TEXT INTO SIGN LANGUAGE

(76) Inventors: Raanan Liebermann, 79 Bayard Ave., North Haven, CT (US) 06473; Boris Nalibotski, 5 Holly Ter., New London, CT (US) 06320; Joshua E. Liebermann, 14 Overbrook Rd., North Haven, CT (US) 06473; Grigory Karapetian, 29-145 Slobodskaya st, Minsk (BY); Yuri Ilyich, 17-2-41 Fedorov st, Minsk (BY); Alexander Nedzved, 7-32a Engels st, Minsk (BY); Anton Podoprigora, 28-1-131 Izvestiy Ave, Minsk (BY); Alex Zapolsky, 6-4 Leningradskaya st, Minsk (BY); Maureen Rosselli, 4 Marbar St., Branford, CT (US) 06405; Biruk Oleg, 35-79 Izvestia St., Minsk (BY)

( * ) Notice: Subject to any disclaimer, the term of this patent is extended or adjusted under 35 U.S.C. 154(b) by 1489 days.

(21) Appl. No.: 10/219,630

(22) Filed: Aug. 14, 2002

(65) Prior Publication Data
US 2004/0034522 A1 Feb. 19, 2004

(51) Int. Cl.
G06F 17/28 (2006.01)
(52) U.S. Cl. .................. 704/7; 704/8; 704/9; 704/10
(58) Field of Classification Search ............... None
See application file for complete search history.

(56) References Cited

U.S. PATENT DOCUMENTS

| | | | | |
|---|---|---|---|---|
| 4,883,061 | A * | 11/1989 | Zeimer | 600/477 |
| 5,602,596 | A * | 2/1997 | Claussen et al. | 725/37 |
| 5,659,764 | A * | 8/1997 | Sakiyama et al. | 704/3 |
| 5,890,120 | A * | 3/1999 | Haskell et al. | 704/271 |
| 5,982,853 | A * | 11/1999 | Liebermann | 379/52 |
| 6,006,183 | A * | 12/1999 | Lai et al. | 704/235 |
| 6,116,907 | A * | 9/2000 | Baker et al. | 434/156 |
| 6,215,890 | B1 * | 4/2001 | Matsuo et al. | 382/103 |
| 6,377,925 | B1 * | 4/2002 | Greene et al. | 704/271 |
| 6,570,583 | B1 * | 5/2003 | Kung et al. | 345/661 |
| 6,738,535 | B2 * | 5/2004 | Kanevsky et al. | 382/312 |

* cited by examiner

Primary Examiner—Richemond Dorvil
Assistant Examiner—Leonard Saint Cyr
(74) Attorney, Agent, or Firm—Bachman & LaPointe, P.C.

(57) ABSTRACT

The present invention relates to a method and apparatus for seamlessly transitioning text into sign language. The apparatus comprises an encoding module and a translation module. The encoding module includes a camera for recording visual images of a model signing words and phrases, a video box for providing each of the images with a position code, and a processing unit with a memory for storing each of the recorded images so as to create a database of sign language video clips. The translation module includes a processing unit, a monitor associated with the processing unit for displaying a visual output in seamless sign language and a textual output, and a memory containing the database associated with the processing unit.

28 Claims, 7 Drawing Sheets

METHOD AND APPARATUS FOR SEAMLESS TRANSITION OF VOICE AND/OR TEXT INTO SIGN LANGUAGE

BACKGROUND OF THE INVENTION

The present invention relates to a method and an apparatus for seamlessly transitioning text, video, sound and other inputs into an output of one or more of dynamic images, such as sign language, text, sound, vibrations, etc. and more particularly in an embodiment to a method and an apparatus for encoding, storing, and retrieving signs in a given sign language and displaying them in the form of continuous seamless animation.

There are two conventional methods for obtaining images such as sign language images. That is, one for using images photographed by a camera as they are and the other for generating animated images, such as those in sign language animations of graphics, created on a computer. The former method is superior to the latter from the viewpoints of, clarity and natural appearance, because it uses the photographed images as they are. However, it cannot effectively display actions inserted between the images of, say, sign-language words in an accurate and natural manner.

SUMMARY OF THE INVENTION

Accordingly, it is an object of the present invention to provide an apparatus for seamlessly transitioning text and other inputs into sign language and other outputs.

It is another object of the present invention to provide a method for seamlessly transitioning text and other inputs into sign language and other outputs.

It is still another object of the present invention to provide a method for creating a sign language database.

It is yet another object of the present invention to provide an apparatus for creating a sign language database.

The foregoing objects are attained by the apparatus and method of the present invention.

In accordance with a first aspect of the present invention, a method for creating a sign language database broadly comprises the steps of recording an image of a model signing a sign for at least one letter or word, placing a video box having a plurality of numbered cells over the recorded image, providing the recorded image with a code identification using the video box, and storing each recorded image and its respective code identification in a database.

In accordance with a second aspect of the present invention, an apparatus for creating a database containing a plurality of images representing the signing of words and phrases is provided. The apparatus broadly comprises means for recording visual images of a model signing the words and phrases, means for providing each of the images with a position code, and means for storing each of the recorded images.

In accordance with a third aspect of the present invention, a method for providing a user with a translation of an input into sign language is provided. The method broadly comprises providing a translation module communicating with a database containing sign language video clips which form a dictionary, inputting into the translation module an input containing at least one word, converting the at least one inputted word into at least one of a textual output and a visual output, and displaying at the user's option at least one of the textual output and the visual output to the user.

In a fourth aspect of the present invention, an apparatus for providing a user with at least one of a textual output, a visual output such as in sign language, and a voice output is provided. The apparatus broadly comprises a processing unit, a display monitor for presenting said textual output and said visual output in sign language connected to said processing unit, means for generating a voice output associated with said processing unit, and a dictionary stored in a memory. The dictionary contains video clips of signed words and phrases. The memory is accessible by said processing unit.

Other details of the method and apparatus for seamlessly transitioning text into sign language of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention deals with an apparatus for seamlessly transitioning text and other inputs into sign language and other outputs and to a computer implementable method for either one or more of encoding, storing, retrieving and displaying visual signs used in sign language. The apparatus is comprised of two separate parts—the encoding module 10 shown in FIG. 1 and the translation module 12 shown in FIG. 2.

Figure 1:
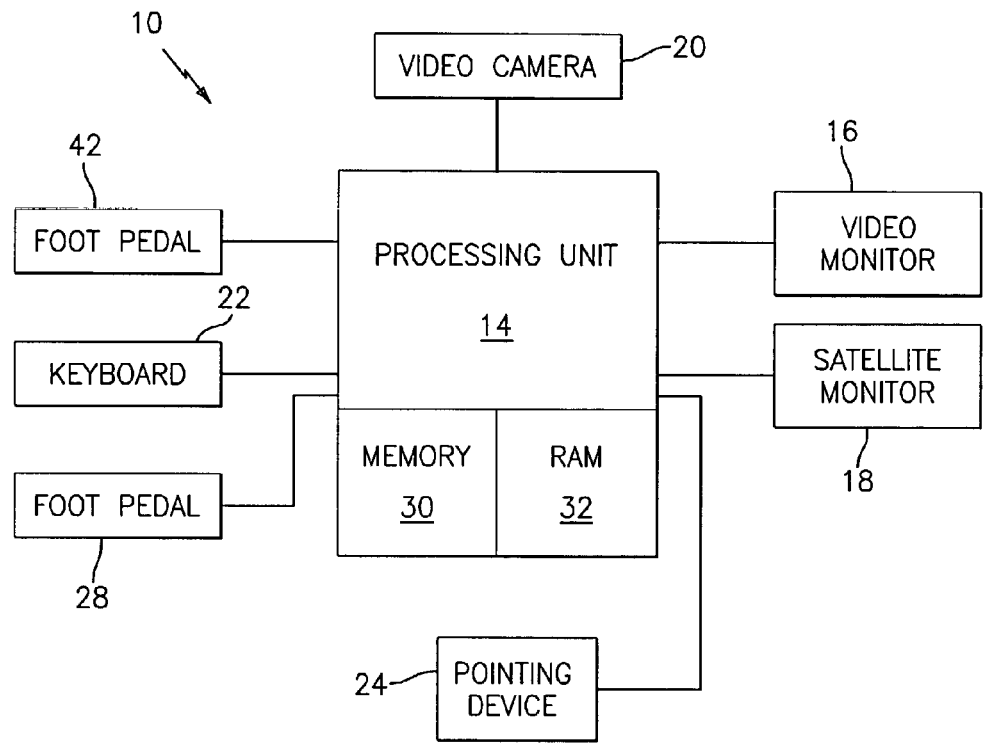
FIG. 1 is a schematic representation of an encoding module used in the apparatus of the present invention.

Referring now to FIG. 1, the encoding module 10 includes a processing unit 14 which includes a pass through and which is connected to a video monitor 16, a satellite monitor 18, a video camera 20, keyboard input 22, a pointing device 24, such as a mouse, and a foot pedal 28 and 42. The processing unit 14 may include long-term memory 30, such as a fixed disc drive, for storing a video clip database of words and phrases in sign language and a random accessible memory 32.

The processing unit 14 may comprise any suitable processing unit known in the art such as a personal computer using a microprocessor and operating under a graphical user interface, such as Microsoft's "Windows 98". The microprocessor may be a Pentium II model processor operating at 400 megahertz. The system may have 32 megabytes of RAM. The Windows program may also include video compression codec, such as Microsoft's MPEG 4 or Intel's Indeo.

Figure 2:
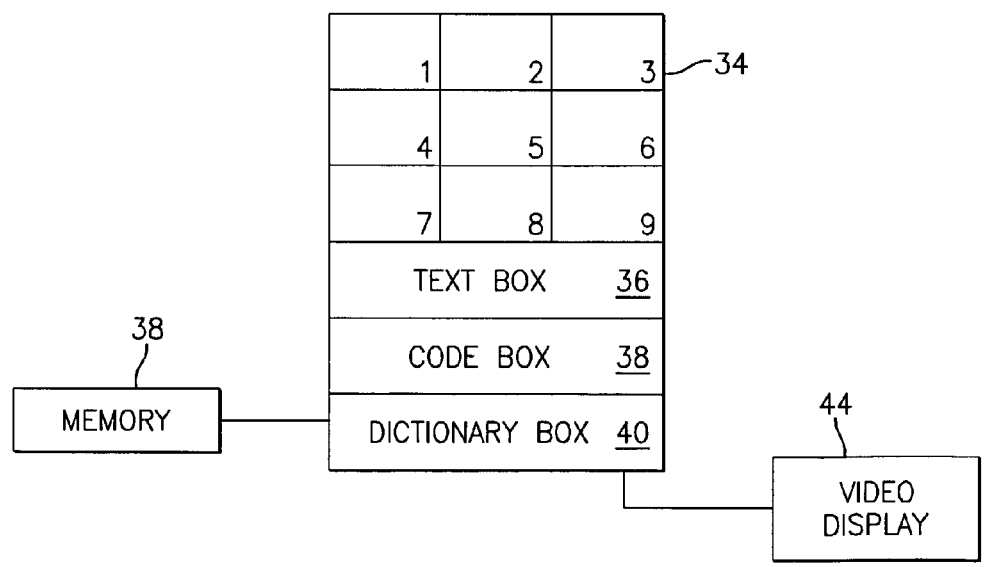
FIG. 2 is a schematic representation of an encoding interface.

As shown in FIG. 2, an encoding software interface preferably comprises a computer implemented video box 34 for displaying live video from the camera 20 and playing already recorded video clips, a text box 36 for entering the string identification (ID) for the current video clip, a code box 38 for entering a position code and a dictionary box 40 for displaying all words and phrases entered into the sign language database. The video box 34 is divided into nine unequal rectangular cells with two vertical and two horizontal lines, which are superimposed on the live image. Every cell is assigned a number from 1 to 9 starting from left to right, top to bottom.

During encoding, two people may control the system. The controlling parties may be a signing model using a left click foot pedal 28 and an operator using a pointing device 24. To initiate the recording of a video fragment, the model presses the left click foot pedal 28, which sends a signal to the processing unit 14 to start capturing the live video from the camera 20 and depositing same into the memory 32 or 30. At the end of a particular gesture being recorded, the model presses the left click foot pedal 28 again, which triggers termination of the capture sequence initiated by the processing unit. During the signing of a particular word or phrase, the model can observe himself/herself on the satellite monitor 18. For convenience, the image on the monitor 18 is mirrored. After the recording of the signed word or phrase is complete, the model may check the validity of the clip by pressing the right click foot pedal shown as foot pedal 42. The right click foot pedal 42 and the left click foot pedal 28 may be a unitary device. This sends a signal to the processing unit 14 to play back the video sequence from the memory 32 or 30. If the sign is correct, the operator using the keyboard 22 may enter a string ID (a word or phrase corresponding to the sign) in the text box 36 and a 4-digit position code in the code box 38. The position code defines the cells (numbered 1 to 9) for the initial and final position of the right and left hands of the model during the signing sequence which was recorded. For instance, if the sign which has been recorded started with the right hand in cell 3 and the left hand in cell 2, and ended with the right hand in cell 5 and the left hand in cell 8, the position code would be 3258.

Using the approach outlined herein, video clips stored in the memory 30 can be invoked from the dictionary box 40 at any time, played in one or more video display windows 44 and corrected for errors in string identifiers and position codes.

After the filming of the sign language database or dictionary has been completed, the operator may invoke a code matching procedure, which generates a list of all possible transitional movements identifying them by transitional codes. The transitional movements are movements needed to string two words and/or phrases together. The program run by the processing unit 14 may then be switched into the transition filming mode, in which the model performs artificial hand movements to cover all possible transitions. For instance to perform the transition 4588, the model would position the right hand in cell 4, the left hand in cell 5, press the foot pedal 28 to start recording, and fluently move both hands to cell 8. The operator then saves the transition video clip into the database in the memory 30. The transition movement filming continues until all the generated transition codes are covered. If it is decided later to add more gestures to the sign language database or dictionary, the code matching procedure could be called again to generate additional transition codes that might appear as a result of such an addition.

The encoding module 10 may include an image-processing algorithm designed for automatic determination of positioning code. The signing model may put chroma-key color bands on his/her wrists, for instance, a green band on the right hand wrist and a blue band on the left hand wrist. After the capturing procedure is completed for each gesture performed or signed by the model, the starting and ending frames of the video sequence can undergo a color segmentation analysis which calculates the coordinates of the bands, determines the cells in which the bands are located, and assigns the gesture a corresponding position code. Every frame of the sequence may be processed with a color substitution function, which changes the chroma-key code box, allowing the operator to perform a double check and correct for errors.

Figure 3:
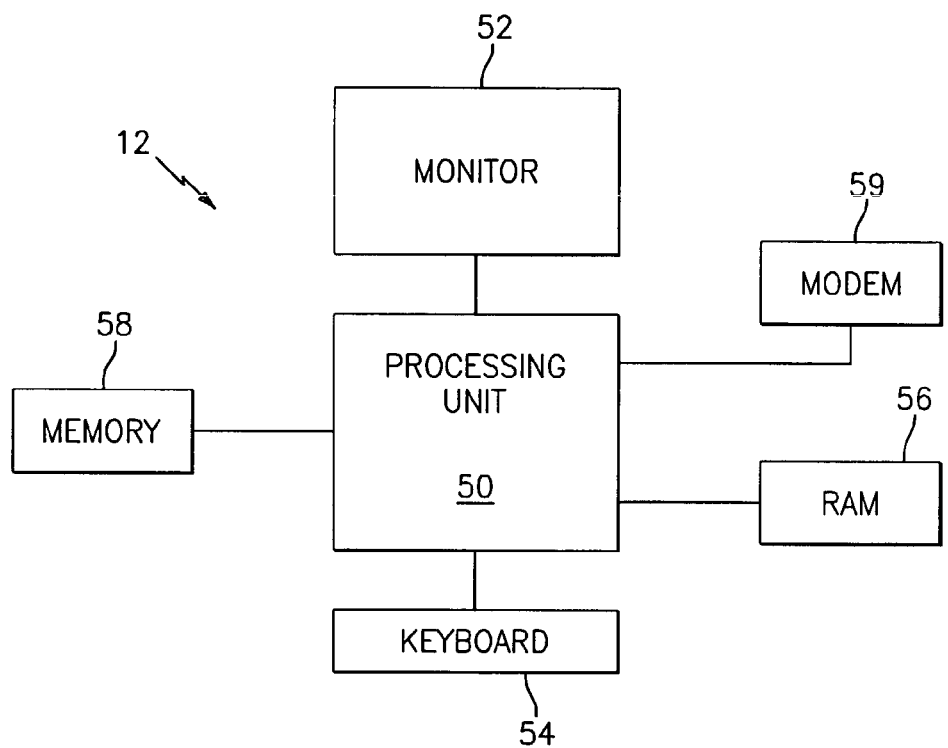
FIG. 3 is a schematic representation of a translation module used in the apparatus of the present invention.

Referring now to FIG. 3, a translation module 12 in accordance with the present invention is illustrated. The translation module 12 may comprise any suitable computer known in the art such as a laptop unit. The translation module 12 preferably includes a processing unit 50, a monitor 52, a keyboard unit 54, a RAM unit 56, and a long-term memory unit 58, such as a fixed (disk) drive, CD ROM or any other type of computer readable medium or computer accessible source, such as network drive or an Internet server. The processing unit 50 may comprise an IBM-compatible personal computer with a microprocessor operating under a graphic user interface (GUI), such as Microsoft's Windows 98. The microprocessor may have the capabilities of a Pentium model processor operating at 200 MHz or higher and 32 megabytes or more of RAM. Additionally, the Windows program may incorporate a video compression codec of the same type as was used for video encoding.

Figure 4:
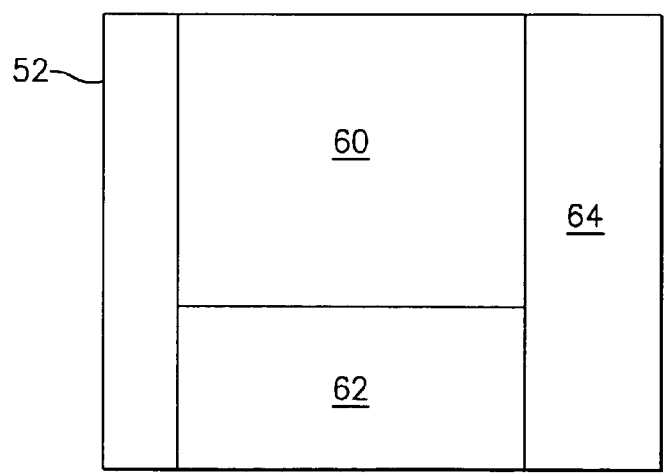
FIG. 4 is a schematic representation of an output display generated by the translation module of FIG. 3.

The translation software interface includes a display on the monitor 52 which, as shown in FIG. 4, is composed of a video box 60 for displaying sign language translation, a text box 62 for inputting the text to be translated, and an optional dictionary box 64 for displaying the content of the system dictionary. By providing the dictionary box, a user has the ability to scroll through the dictionary box and double click any word to see it signed, or utilize an arrow key on the keyboard to scroll to the desired word and then press enter. One can also input a word to be found in the dictionary using the keyboard. In the latter case, the algorithm predicts the word by recognizing the letters not associated sequentially with another word.

When a user initiates the translation procedure, the algorithms used by the processing unit 50 in the translation module 12 start parsing the text into string tokens and use them as string identifiers to retrieve corresponding video clips from the video clip sign language database which resides in the long term memory unit 58. While a retrieved clip is decompressed and displayed in the video box 60, the program used by the processing unit 50 finds the database entry for the next text token and fetches its position code. Then the program combines the position code of the next sign to generate a proper transition code by using the two last digits of the first position code and two first digits of the second position code. For instance, if a current word has the position code 5828 and the next word has the code 6555, the transition code generated by the program would be 2865. By using this transition code as a database key, the program automatically retrieves a corresponding transition video clip, decompresses it, and displays it in the video box 60, and then proceeds to the next word to repeat the procedure. If a word is not found in the database, it may be replaced by finger spelling of the word by displaying a sequence of signs for single letters. As a result of the program used by the processing unit 50, the user observes the signing of the model that appears fluent and natural with no video gaps between consecutive signs. The program employed by the processing unit may be in any suitable programming language known in the art.

Figure 5:
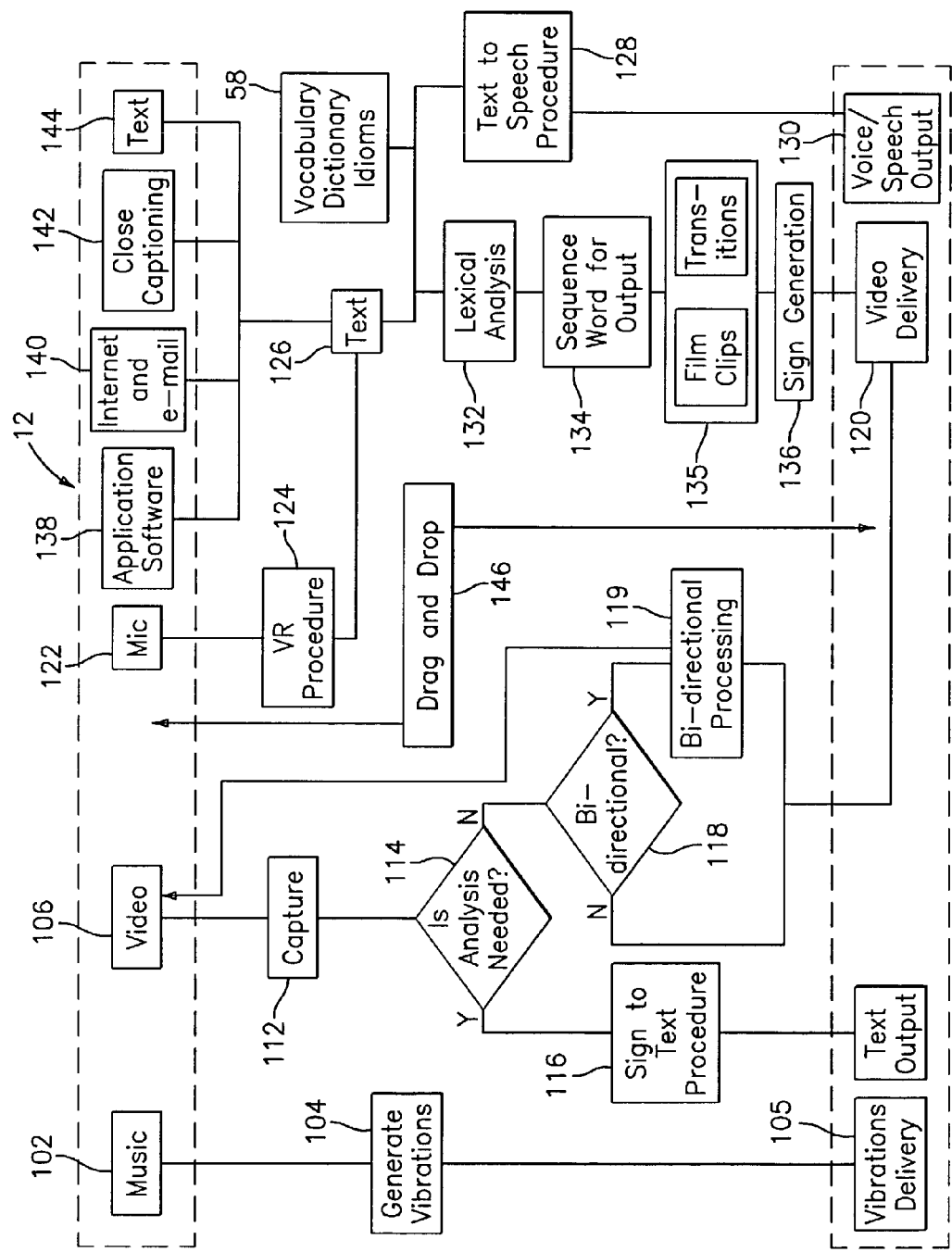
FIG. 5 is a schematic representation of a translation module in accordance with the present invention.

FIG. 5 illustrates one embodiment of a translation module 12 for providing sign language translations to persons with hearing disability and other users. The module 12 is capable of receiving inputs from a wide variety of sources and furnishing sign language and other outputs to users. For example, one of the inputs to the module 12 may be a musical or tone generation input 102. As shown in FIG. 5, the musical input may be passed through a vibration generator 104 and delivered to a user via an appropriate vibration delivery device 105. The output of the vibration delivery device 105 may be in addition to another output generated by the module 12.

Another input to the module 12 may be a video input 106. The video input 106 may come from any source. After the video input is received, it is passed through a capture device 112 where the video is stored in the memory 56 and/or 58. Thereafter, in box 114, the program run by the processing unit 50 determines whether analysis of the input is needed. If analysis is needed, the video input is passed through a sign to text procedure outlined as shown in box 116 with the resulting text output being displayed visually on a screen such as monitor 52. The text output may be displayed by itself or may be displayed with the video. If no analysis is needed, the processing unit 50 then determines whether the input is bidirectional in box 118. If the video input is bidirectional, the input is processed in box 119 so that one half coming from, say, user one is delivered to the monitor 52 for display and one half coming from, say, user two is fed back to the video input/output 106. The output of the bidirectional processing is then delivered to a video output device 120, such as the video box 60 on the monitor 52, where the video is displayed. If the input is not bidirectional, it may be forwarded directly to the video output device 120.

Still another form of input is an oral input via microphone 122. For example, the oral input may be a lecture being given by an educator in a class room. The input from the microphone 122 is passed through a voice recognition program 124 where it is converted into text. The voice recognition program 124 may be any suitable voice recognition program known in the art. The text is delivered to box 126. At the option of the user, the text may be converted to speech in box 128 and then displayed in the form of a voice or speech output in box 130. The program used to convert the text to speech used by the processing unit 50 may comprise any suitable program known in the art. Alternatively, or in addition to the speech conversion, the text may be lexically analyzed in box 132.

Figure 6:
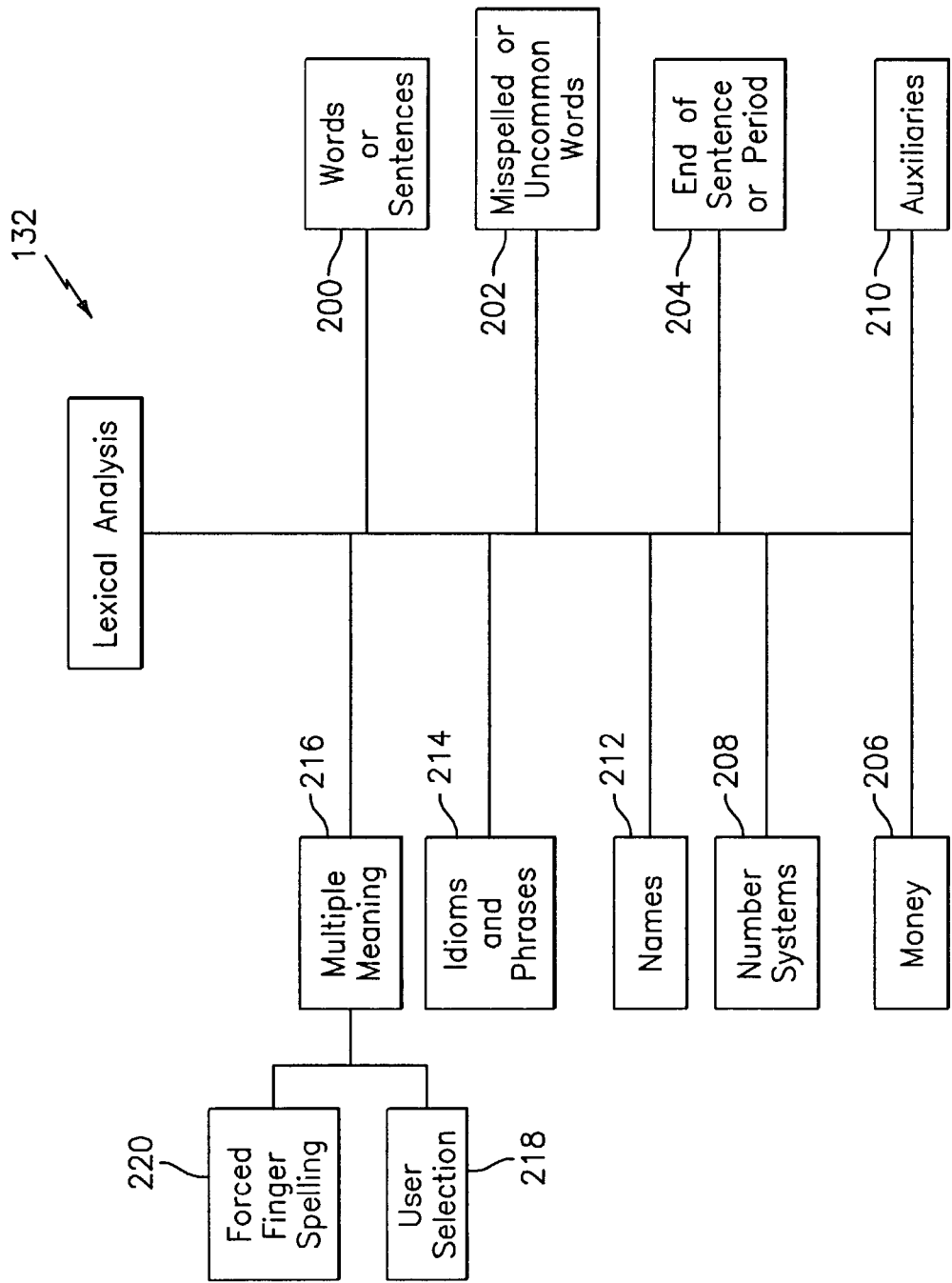
FIG. 6 is a schematic representation of a lexical analysis performed by the translation module.

Referring now to FIG. 6, in the box 132, the words of the text are analyzed to determine whether the input is words or sentences in box 200, whether the words are misspelled or uncommon words in box 202, whether a sentence has been spoken and a period is needed in box 204, whether the words refer to money in box 206, whether the words refer to number systems in box 208, whether the words include auxiliaries, such as the words "to", "the", "a", "at", "are" and "am" in box 210, whether any of the words are names in box 212, whether the words are idiom and/or phrases in box 214, and/or whether the words have multiple meanings in box 216. If the words do have multiple meanings, all meanings may be provided to the user in box 218 so that the user can select the appropriate meaning. Alternatively, words which can not be found in the sign language database in memory 58 may be displayed as forced finger spelling as shown in box 220. Also by highlighting any word, even if signing is available in the database, and by forcing finger spelling, the finger spelling takes priority over the signed word. The foregoing analysis may be carried out by the processing unit 50 using any suitable program in any suitable language.

After the analysis has been completed, the program being implemented by the processing unit 50 sequences the words for output in box 134. After the words have been sequenced, the film clips of the words and/or phrases and any transition clips which are needed are removed from the database and sequenced in box 135. In box 136, the sign language sequences are generated and displayed on the video delivery device 120 such as the video box 60 on monitor 52. In addition to the sign language sequence that has been generated, the actual text that has been converted may be simultaneously displayed.

Still other inputs to the module 12 may be application software 138, Internet and e-mail inputs 140, close captioning inputs 142, and text inputs 144. For example, a user may download reading material, sometimes referred to as an electronic book, or a portion of an electronic book, from the Internet or a disk such as a CD-ROM and convert the downloaded material into a sign language video display and/or a voice or speech output and/or vibrational output. Once received, these inputs may be processed in the same manner as the oral input without passing the input through the voice recognition program except when the download also contains speech. Further, the output generated by the module 12 may be the sign language video sequence, written text, and/or a voice/speech output. Further, a musical and/or vibrational output may be generated.

If desired, the various inputs to the module 12 may be included in the output display of the module 12. The processing unit 50 may be provided with a drag and drop program as shown in box 146 which allows the user to take a mouse, click on a various input, and drag and drop the selected input into the output display. Thus, a text input could be dragged into the output display on the monitor 52 so that it can be displayed in signing along with a textual output. The drop and drag program may comprise any suitable program known in the art. The drag and drop also works in the reverse. One can click, say, on the image on display 60 and drag the cursor of the mouse outside the display of FIG. 4 and drop it there, to create a stored file with the content of the text box 62.

The ability to have dial-up text and video enables two individuals to communicate in real time by telephone. To do this, the module 12 needs a modem supporting TAPI and a camcorder on the transmitting and receiving sides. Modems connect by using TAPI. As soon as connection is established the calling module switches into the video wait mode, while the receiving module switches into the data transmit mode. Three types of data may be transmitted via the modem connection—namely, system data, video data, and text information.

The program may then function in the half duplex mode, i.e. text and system data may be transmitted in the duplex mode, while video may be transmitted in the simplex mode. All data received by a modem 59 may be processed by a system of filtering and packaging, i.e. any data transmitted may be converted into a packet and transferred into a buffer from which the data may be read out and transferred directly to the modem 59. This allows transmission of all types of packets simultaneously. Every packet may consist of two parts—the system information (header) and data—and may end in a special character. The header may contain information that allows checking the integrity of the packet—the data and header checksums. At the receiving side, the data traffic may be converted into packets, and the text information and video data may be analyzed on the spot, while the video data may be transferred to the video packet queue.

Frame grabbing required for transmitting may be done according to a timer at a fixed frequency during all of a session, and the video data obtained may be coded and transferred to the transmitted data buffer. At the receiving side, frames may be retrieved from the queue also according to the timer as the same fixed frequency, the frequency synchronization of the transmitting and receiving sides being the responsibility of the users. Then the data may be decoded and displayed.

This communication program can work not only via a modem connection, but also via cable. All the modem and direct connection settings may be available in a setup dialog box. A user can also choose the frame grabbing frequency (frames per second) as well as the codec and frame grabber used.

The program interface may consist of three main windows—namely, the video window, the text window, and the control window. Clicking the show and chat buttons on the control window can hide the first two of the windows.

Figure 7:
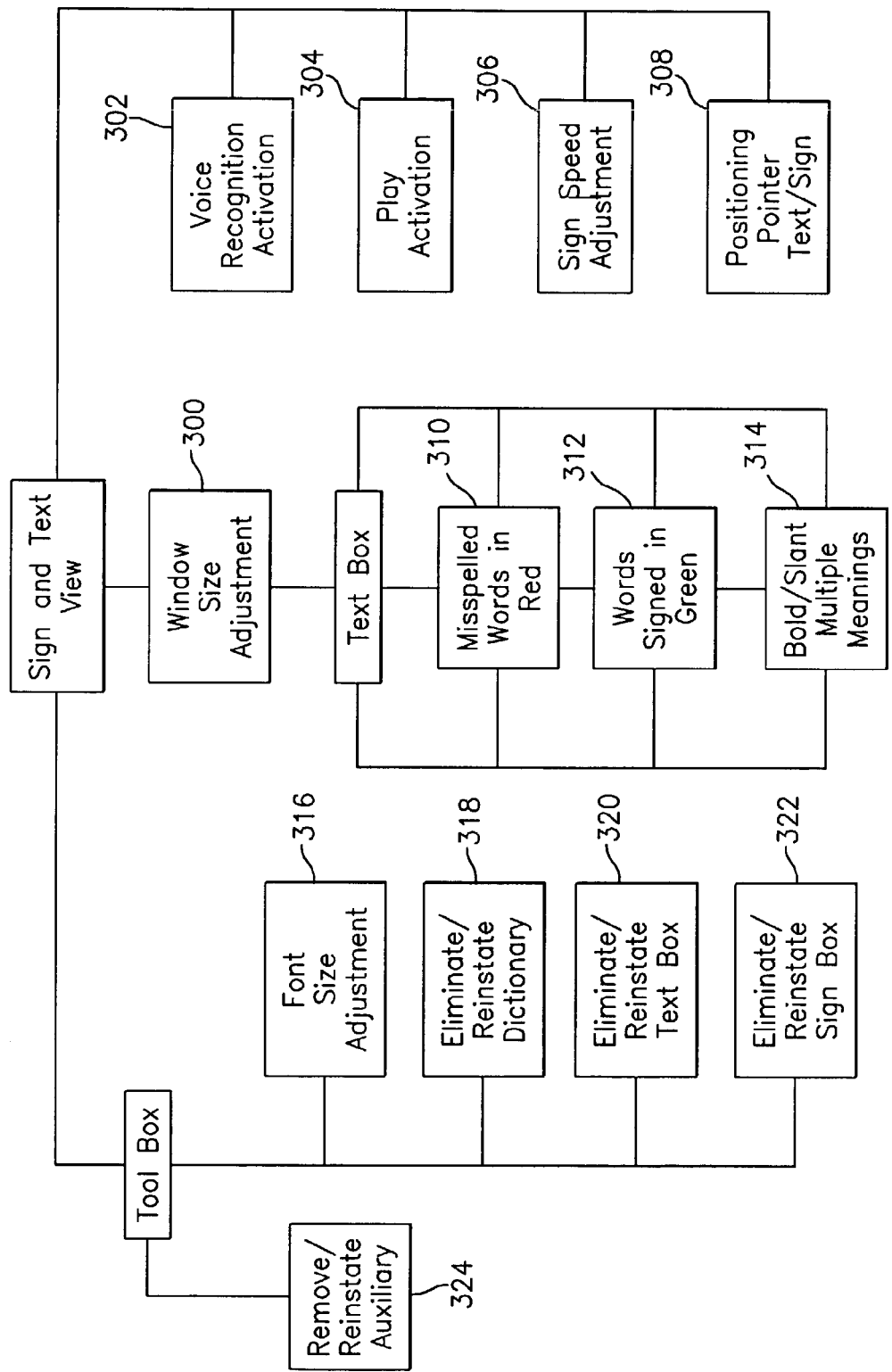
FIG. 7 is a schematic representation of various functions which can be implemented by the processing unit used by the translation module.

Referring now to FIG. 7, the module 12 may be provided with a wide range of capabilities. For example, as discussed above, the module 12 may display both video outputs in sign language and text outputs to a user. The module 12 may be provided with any suitable means known in the art for adjusting the size of the window displaying the text and/or the sign language video as shown in box 300. Still further, the module 12 may be provided with voice recognition activation as shown in box 302, play activation as shown in box 304, sign speed adjustment as shown in box 306 so that the module 12 may be used by the range from either a beginner to/or an experienced sign reader, or means for positioning a pointer in the text and/or sign language video display boxes as shown in box 308. With regard to the text display box, the module 12 may be provided with means for allowing misspelled words to be displayed in a color such as red as shown in box 310, for allowing signed words to be displayed in another color such as green as shown in box 312, and/or for providing bold/slanted script for words that have multiple meanings as shown in box 314. Still further, the module 12 may be provided with means for adjusting the font size of displayed text as shown in box 316, means for eliminating or reinstating the dictionary of signed words as shown in box 318, means for eliminating and/or reinstating the text display box as shown in box 320, and/or means for eliminating and/or reinstating the sign output display box as shown in box 322. Still further, the module 12 may be provided with means for removing and/or reinstating auxiliaries as shown in box 324. The foregoing functions may be provided via programming of the processing unit 50 using any suitable language known in the art and may be implemented by a key stroke and/or by depressing a button on a mouse.

As can be seen from the foregoing description, the translation module 12 can convert speech to text and/or generate a visual display in sign language. The text to sign translations provided by the module 12 correctly signs various numbering systems including money, time, phone, decimals, dates, and codes, accurately differentiates multiple meaning words, synchronizes audio with any signing speed, allows two way communication. The signing video box allows quick translation of text from anywhere such as e-mail and the Internet. The module 12 also allows the signing dictionary stored in the memory of the module 12 to be displayed on screen. Inputted material can be saved in the memory or can be subject to the aforementioned drag and drop procedure. The text output box has a spell checker built therein. Also, the module allows any signed word to be finger spelled, thus allowing the module to be used as an educational tool or for regional sign "dialects". Still further, the signing speed may be adjusted from 25% to 300%. The module 12 may further be provided with the ability to forward, pause and rewind to any desired word or segment of text.

The module 12 may offer different vocal selections. A user may also select either synchronous or asynchronous speech. In synchronous speech mode, the module will automatically translate the voice into sign language and text. In asynchronous speech, the module will recognize the voice and translate it to text. The module will allow the text to be signed if desired. The module 12 may also be programmed to adjust the speed of the voice to match the speed of the signing and to allow adjustment of the playback volume.

Using the module 12, a user can select the displays to be output. For example, the user can select the dictionary box, a text box, and a video display box to be displayed.

The module 12 allows text to be saved from the text box. The module 12 can also be used to send text as an e-mail by dragging the text into e-mail, note pad, or desktop.

If desired, the translational module may be implemented in a web version which is located on a web server. It may receive a textual input remotely through the Internet from a client machine and send back a generated video output in sign language in the form of a streaming media. Also a video clip unit with signed output can be sent via e-mail or the Internet to a user who can display such video clip on his/her web server for other users to see.

Figure 8:
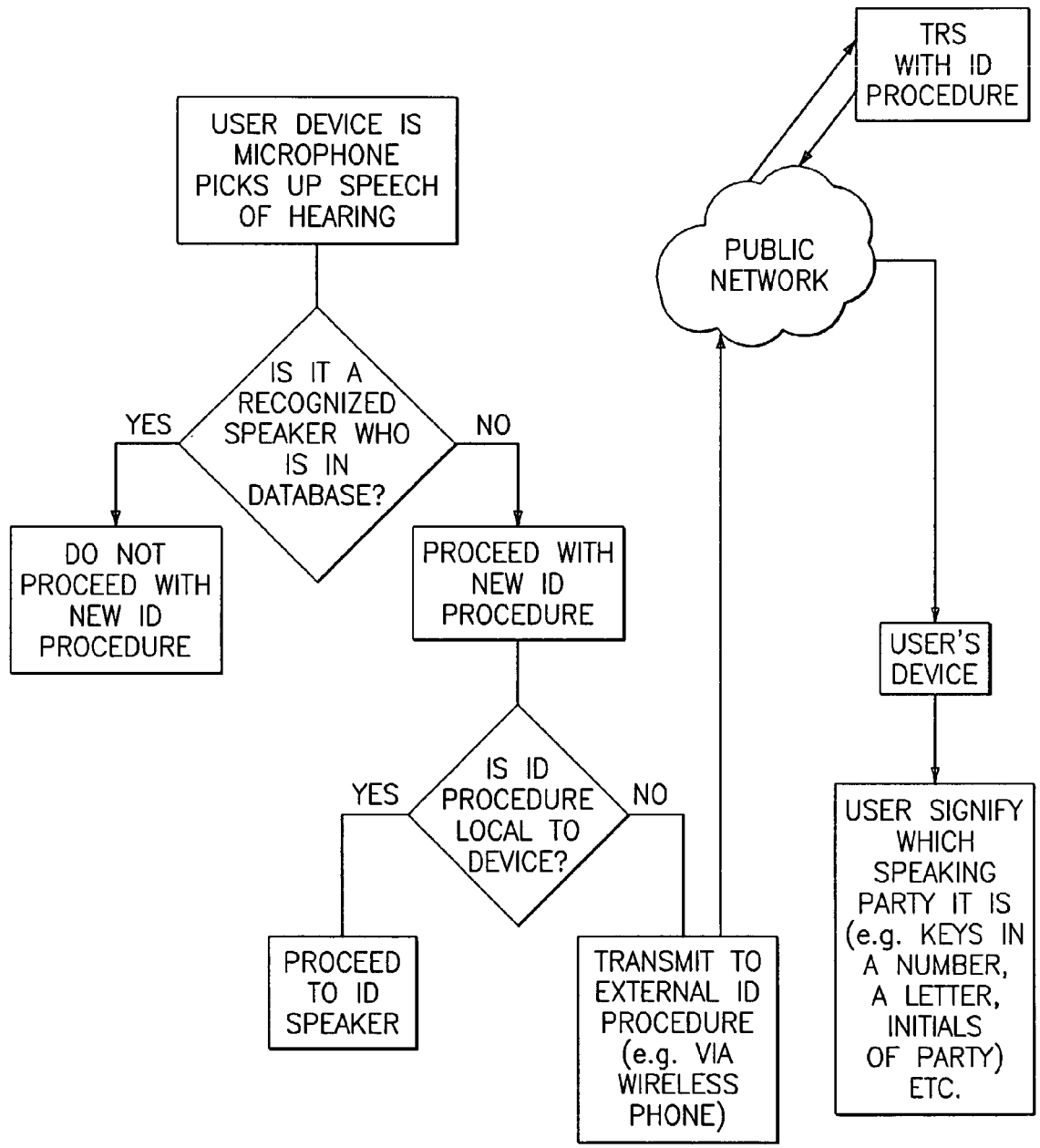
FIGS. 8 and 9 are a schematic representation of a selective voice identification procedure.
Figure 9:
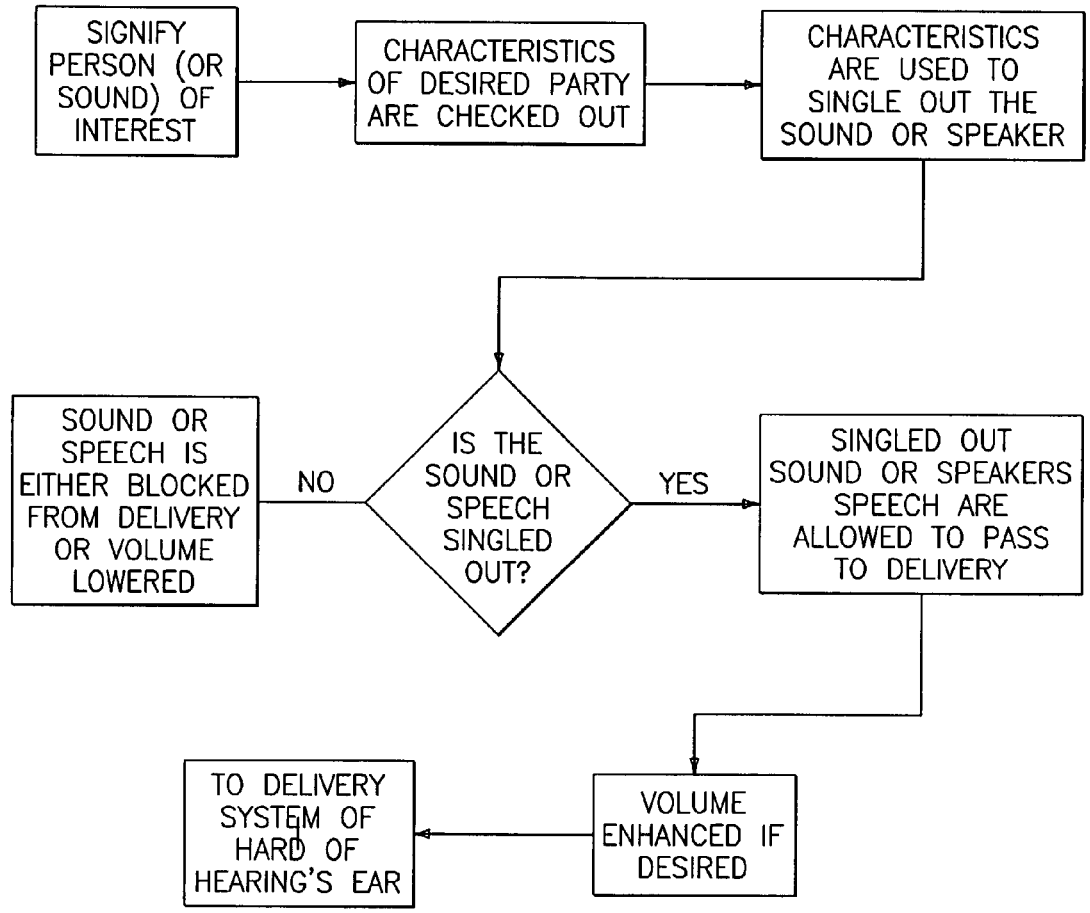

Referring now to FIGS. 8 and 9, a scheme for enabling a person with hearing and speech disability to select a particular party from a group and "tune in" only to the output of that person, such as when the person is speaking while other persons next to him are speaking as well. The output can be voice, text, signing, or a combination of two or more of these outputs. The selective party's input can be divided into two stages which are illustrated in FIGS. 8 and 9. In stage A, shown in FIG. 8, the user arranges for a voice signature and an identification of the party. In stage B, shown in FIG. 9, the procedure is utilized to receive only input from a desired party at a particular moment.

Referring again to stage A, in this stage, the user first determines if another party's identification already appears in the database and there is no further need for stage A procedure. If the party's voice signature is not in the database, then the user can utilize either a local device procedure or a TRS procedure for registering voice signature with the specific party's identification. The identification can be a name, initials, a number, or any combination of alphanumeric symbols. The identification is coupled with the voice signature obtained from a word or sentence uttered by the party.

Referring now to FIG. 9, the translation module after calibration enables the user to optionally discern who speaks or lets the user decide who is the speaking party the user wishes to concentrate on. Once the particular speaker has been targeted, only communication from such user will be outputted to the user. The microphone may pick up all kinds of white noise in the immediate environment, such as room noise, as well as various parties talking. The person who has a hearing and speech disability signifies to the device, which person or sign is of interest (e.g., by seeing that he/she is saying something to whoever is in the area). Such identification by the user can be accomplished by using a keyboard to key in an appropriate number, letters signifying initial, etc. The selection can also be done by a pointing device, such as a mouse, where the user points on the screen to a particular position on the screen or to any alphanumeric combination. The translation module (with or without the help of the TRS) checks the identifications of the parties who are either present in the area or are callers using telephone or wire. The identification of the parties is achieved by checking their various voice signatures on file. The voice signature of the desired party enables to verify that clearance is given to that particular speaker. Thus, only that party's voice content is either amplified and/or transmitted, while the rest are blocked (or stay unamplified).

The translation module unit 12 can be used in a classroom. The following enhancements are useful for such an environment.

The voice capturing of the speaker or instructor can be captured by the translation module 12 itself and either use the embedded voice recognition or connect to a telephone relay service (TRS) utilizing telephone or wire for that purpose where a CA can transliterate or assist the voice recognition provided by the module 12 by viewing the generated text transmitted to the TRS together with the optional voice of the speaker and correct text elements that seem to be wrong before transmitting the text only back to the user's module 12.

The voice capturing can further be facilitated by a centrally mounted microphone system that connects to the unit or via the school telephone system to the unit and a TRS that either is signified by the individual user, by the school, or by the module itself.

The module 12 itself may have two added features for the classroom. One is an optional video or still camera accessory that can capture whatever is on a blackboard or screen and calibrate its output together with the appropriate signing relevant to the speech that goes with it.

Another added feature may be the ability to receive telephone calls while in the classroom or a lecture hall. Such ability exists when the module 12 is connected to a TRS center where the user has previously registered (i.e., identified himself by for example a telephone number that will enable to reach him while at the classroom). The user then has the option to answer the telephone call that is outputted to him/her by text, signing, or both. While the user is conducting a discussion with the assistance of the CA (e.g., user uses text to transmit his communication), the speaker's output goes through a local voice recognition capability of the module 12 and is stored in a file. Upon termination of the telephone call, the user has two options. He/she can either continue with the current output of the speaker and review later the historic material that has been accumulated in a file, or start with the historic material and move to the current output of the speaker. The registration at the TRS also codifies the school, class, day and time. Thus when multiple persons with hearing disability all use independent units in the class, the CA selection algorithm enables using a single CA that can be multiplexed to all such users.

Another utility of the module 12 is its function as a Payphone Assisted Messenger ("PAM"), which however is not limited only to payphones and can be used with any telephone. Input and output of the module 12 that is text only, is utilized with an accessory that hooks up to any telephone ear/mouthpiece or an appropriate contraption that enables stones to travel to and from the unit. The module 12 or the accessory generates DTMF tone and enables a user to dial a number through the ear/mouthpiece or the contraption. The number dialed is either a toll free number to a TRS center or a 711 number that connects with the local TRS. Upon the connection, all communications with the TRS center are text based and depend on canned pre-prepared messages. Alternatively, the module 12 can use the dialing system of the telephone to dial that number. The communication with the TRS can also be with the utility of text to speech conversion that is known in the art. There are two types of canned messages, global and personal. Global canned messages are the same for every user, such as "Hi, I am calling from a pay phone and using a PAM", or "I am delayed", etc. The global canned messages come with the module 12. The TRS has a duplicate set of such messages. The user creates the personal canned messages, either by utilizing the module 12, or by connecting to a TRS and working with a CA. Also, the canned messages can be stored in the module 12 and/or in a TRS center under a personal ID provided such users. Thus, the TRS will have global canned messages and for some registered users also their personal canned messages. While the canned messages are important for the user who for example may be at a traditional pay phone, the TRS canned messages are not just for convenience but also essential for messages being sent out to the user whose module 12 relies on it. Namely, the CA sends out a number that activates a specific canned message at the module 12 of the user. Such a scheme may enable a user to use only a partial embodiment of the apparatus where no keyboard is needed and where the telephone keypad itself is utilized for identifying and sending messages, a small display can be utilized instead of a full screen and partial electronics, operating system and software programs as well. When the complete module 12 is utilized, the user has the option to receive the incoming canned messages in text and/or in sign language. The PAM recognizes busy tones, or ringing tones and can issue the appropriate message to the user. The PAM includes a display of canned messages or phrases with identifying numbers next to them. The user selects the phrase closest to his/her need and keys in the number next to it (on the unit or the phone keypad). The messages are arranged in groups of commonality and the group of commonality subjects can act as a directory of classes for selection of a particular numbered phrase. For example, a commonality page on the screen will show "Property" with the number 2, "Home" with the number 4, and "Travel" with the number 3. When the user key in number 3, the display changes to show all the phrases related to travel, such as, "When does the train leave" is number 1, "when does the train arrive" is number 2, "where is the bus station" is number 3, etc.

It is apparent that there has been provided in accordance with the present invention a method and apparatus for seamlessly transitioning speech and/or text into sign language which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for creating a sign language database comprising the steps of:
    recording an image of a model signing a sign for at least one word using a camera;
    transforming the recorded image by positioning a computer implemented video box having a predetermined number of cells having assigned numbers over said recorded image of said model signing said sign for said at least one word and providing said recorded image of said model signing said sign for said at least one word with a code identification using said computer implemented video box; and
    compiling said database by storing each said recorded image of said model signing said sign for said at least one word and its respective code identification in a database.

2. A method according to claim 1, further comprising:
    providing a device for initiating said recording step; and
    initiating said recording step by activating said initiating device.

3. A method according to claim 2, wherein said initiating device providing step comprises providing a foot pedal and said recording step initiating step comprising said model depressing said foot pedal.

4. A method according to claim 1, wherein said recording step comprises capturing a live image of said model on a processing unit and said storing step comprises storing said captured image in a memory associated with said processing unit.

5. A method according to claim 1, further comprising:
storing each image on a storage device; and
invoking each said stored image from a directory box.

6. A method according to claim 1, further comprising generating a list of all transitional movements and identifying each of said transitional movements by a transitional code.

7. A method according to claim 6, further comprising performing each of said transitional movements using a live model who places his/her hands in the positions designated by said transition code assigned to a particular transitional movement and recording said performance of each said transitional movement.

8. A method according to claim 7, further comprising saving each said recorded performance in said database.

9. The method according to claim 1, further comprising:
sending a first signal to a processing unit to initiate recording of said video image;
sending a second signal to said processing unit to initiate termination of the recording of said video image; and
said code identification providing step comprising providing a cell number for each hand in an initial position when said first signal is sent and providing a cell number for each hand in a final position when said second signal is sent.

10. A method for creating a sign language database comprising the steps of:
recording an image of a model signing a sign for at least one word using a camera;
transforming the recorded image by positioning a computer implemented video box having a predetermined number of cells having assigned numbers directly over said recorded image of said model signing said sign for said at least one word and providing said recorded image of said model signing said sign for said at least one word with a code identification using said computer implemented video box;
compiling said database by storing each said recorded image of said model signing said sign for said at least one word and its respective code identification in a database; and
playing back said recorded image and verifying that said sign is correct and entering a string identification for said recorded image.

11. A method according to claim 10, wherein said entering step comprises entering at least one word corresponding to said sign.

12. A method according to claim 10, wherein said code identification providing step comprises entering a four digit code representing initial and final positions of the right and left hands for the sign.

13. The method according to claim 10, further comprising:
sending a first signal to a processing unit to initiate recording of said video image;
sending a second signal to said processing unit to initiate termination of the recording of said video image; and
said code identification providing step comprising providing a cell number for each hand in an initial position when said first signal is sent and providing a cell number for each hand in a final position when said second signal is sent.

14. A method for creating a sign language database comprising the steps of:
placing colored wrist bands on the wrists of a model;
recording an image of said model signing a sign for at least one word using a camera;
transforming the recorded image by positioning a video box having a predetermined number of cells having assigned numbers directly over said recorded image of said model signing said sign for said at least one word and providing said recorded image of said model signing said sign for said at least one word with a code identification using said computer implemented video box; and
compiling said database by storing each said recorded image and its respective code identification in a database,
wherein said image recording step comprises capturing images of said colored bands on said wrist.

15. A method according to claim 14, wherein said code identification providing step comprises performing a color segmentation analysis which calculates the coordinates of said colored bands and assigns a corresponding position code by determining the cells of the video box in which the bands are located.

16. The method according to claim 14, further comprising:
sending a first signal to a processing unit to initiate recording of said video image;
sending a second signal to said processing unit to initiate termination of the recording of said video image; and
said code identification providing step comprising providing a cell number for each hand in an initial position when said first signal is sent and providing a cell number for each hand in a final position when said second signal is sent.

17. A method for providing a user with a translation of an input into sign language comprising:
creating a sign language database;
said creating step comprising recording an image of a model signing a sign for at least one word using a camera; transforming the recorded image by positioning a video box having a predetermined number of cells having assigned numbers directly over said recorded image of said model signing said sign for said at least one word and providing said recorded image of said model signing said sign for said at least one word with a code identification using said computer implemented video box; and compiling said database by storing each said recorded image of said model signing said sign for said at least one word and its respective code identification in said sign language database;
providing a translation module communicating with said database containing sign language video clips which form a dictionary;
inputting into said translation module an input containing at least one word;
converting said at least one inputted word into at least one of a textual output and a visual output in sign language;
displaying at the user's option one of said textual output and said visual output to said user;
passing said at least one word through a program for converting said at least one word into text;
converting said textual version of said at least one word into one of a voice output and said visual output;
lexically analyzing said at least one word for multiple meanings, idioms and phrases, names, number systems, money, words and sentences, misspellings, uncommon words, end of sentence, and auxiliaries.

18. A method according to claim 17, wherein said inputting step comprises inputting said at least one word from a microphone.

19. A method according to claim 17, further comprising presenting multiple meanings of a word to said user and allowing said user to said select one of said meanings.

20. A method according to claim 17, further comprising forced finger spelling of a word having said multiple meanings.

21. A method according to claim 17, further comprising:
sequencing said at least one word for output;
retrieving video sign language clips from said database;
generating a seamless visual output display in sign language for said at least one word; and
displaying said seamless visual output display to said user.

22. A method according to claim 17, wherein said inputting step comprises inputting said at least one word from at least one of application software, the Internet, an e-mail, a close captioning device, and a text input device and converting said inputted at least one word into text.

23. A method according to claim 22, further comprising converting said text into at least one of a voice output and into a seamless visual output display in sign language.

24. A method according to claim 17, further comprising:
said inputting step comprising inputting a video; and
converting said video into a textual output.

25. A method according to claim 17, further comprising:
said inputting step comprising inputting a video; and
displaying said video to said user.

26. The method according to claim 17, further comprising:
sending a first signal to a processing unit to initiate recording of said video image;
sending a second signal to said processing unit to initiate termination of the recording of said video image; and
said code identification providing step comprising providing a cell number for each hand in an initial position when said first signal is sent and providing a cell number for each hand in a final position when said second signal is sent.

27. A method for providing a user with a translation of an input into sign language comprising:
creating a sign language database;
said creating step comprising recording an image of a model signing a sign for at least one word using a camera; transforming the recorded image by positioning a video box having a predetermined number of cells having assigned numbers directly over said recorded image of said model signing said sign for said at least one word and providing said recorded image of said model signing said sign for said at least one word with a code identification using said computer implemented video box; and compiling said database by storing each said recorded image of said model signing said sign for said at least one word and its respective code identification in said sign language database;
providing a translation module communicating with said database containing sign language video clips which form a dictionary;
inputting into said translation module an input containing at least one word;
converting said at least one inputted word into at least one of a textual output and a visual output in sign language;
displaying at the user's option one of said textual output and said visual output to said user;
inputting a musical input into said translational module; and
outputting vibrations representatives of said musical input.

28. The method according to claim 27, further comprising:
sending a first signal to a processing unit to initiate recording of said video image;
sending a second signal to said processing unit to initiate termination of the recording of said video image; and
said code identification providing step comprising providing a cell number for each hand in an initial position when said first signal is sent and providing a cell number for each hand in a final position when said second signal is sent.

* * * * *